United States Patent
Oshima et al.

(10) Patent No.: US 7,522,896 B2
(45) Date of Patent: Apr. 21, 2009

(54) FILTER CONTROL METHOD, SIGNAL PROCESSING CIRCUIT AND INTEGRATED CIRCUIT FOR WIRELESS RECEIVER

(75) Inventors: Takashi Oshima, Yokosuka (JP); Masaru Kokubo, Hanno (JP)

(73) Assignee: Renesas Technology Corp., Tokyo (JP)

( * ) Notice: Subject to any disclaimer, the term of this patent is extended or adjusted under 35 U.S.C. 154(b) by 402 days.

(21) Appl. No.: 11/251,922

(22) Filed: Oct. 18, 2005

(65) Prior Publication Data
US 2006/0084402 A1 Apr. 20, 2006

(30) Foreign Application Priority Data
Oct. 19, 2004 (JP) .............................. 2004-303887

(51) Int. Cl.
H04B 1/06 (2006.01)
H04B 1/16 (2006.01)

(52) U.S. Cl. .................... 455/232.1; 455/136; 455/138; 455/339

(58) Field of Classification Search ................. 455/136, 455/138, 232.1, 240.1, 339, 340, 334, 355, 455/130
See application file for complete search history.

(56) References Cited

U.S. PATENT DOCUMENTS

| 4,630,117 | A | * | 12/1986 | Parker .......................... 348/678 |
| 5,822,772 | A | * | 10/1998 | Chan et al. ................... 711/158 |
| 6,459,458 | B1 | * | 10/2002 | Balaban ....................... 348/678 |
| 6,501,944 | B1 | * | 12/2002 | Szydlowski et al. .......... 455/266 |
| 6,862,327 | B2 | * | 3/2005 | Van Sinderen .............. 375/345 |
| 2005/0221788 | A1 | * | 10/2005 | Pan ............................. 455/339 |
| 2005/0221789 | A1 | * | 10/2005 | Pan ............................. 455/339 |
| 2007/0080835 | A1 | * | 4/2007 | Maeda et al. ................ 341/120 |
| 2008/0030269 | A1 | * | 2/2008 | Tsuda et al. ................. 330/149 |

FOREIGN PATENT DOCUMENTS

JP 2004-072576 3/2004

* cited by examiner

*Primary Examiner*—Sonny Trinh
(74) *Attorney, Agent, or Firm*—Miles & Stockbridge P.C.

(57) ABSTRACT

A conventional method of controlling the passband of a filter involves an increase in cost for a chip due to a large area of a detection circuit for determining the level of an interference wave. The present invention utilizes a result obtained by detecting the amplitude level of a signal with an automatic gain control circuit to appropriately control the passband of a filter. The amplitude level of all the signals including a desired wave and an interference wave is detected by utilizing the automatic gain control circuit to thereby control the passband of a filter on the basis of the result.

22 Claims, 15 Drawing Sheets

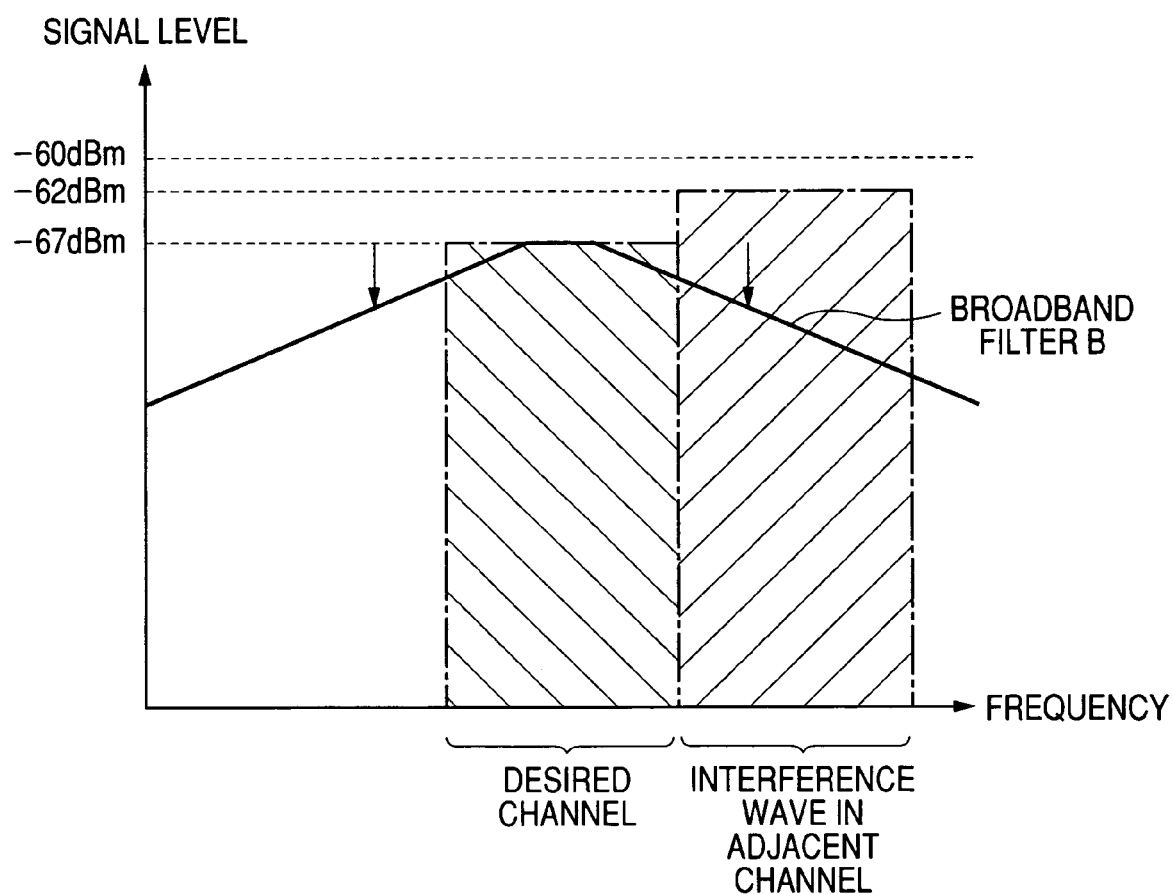

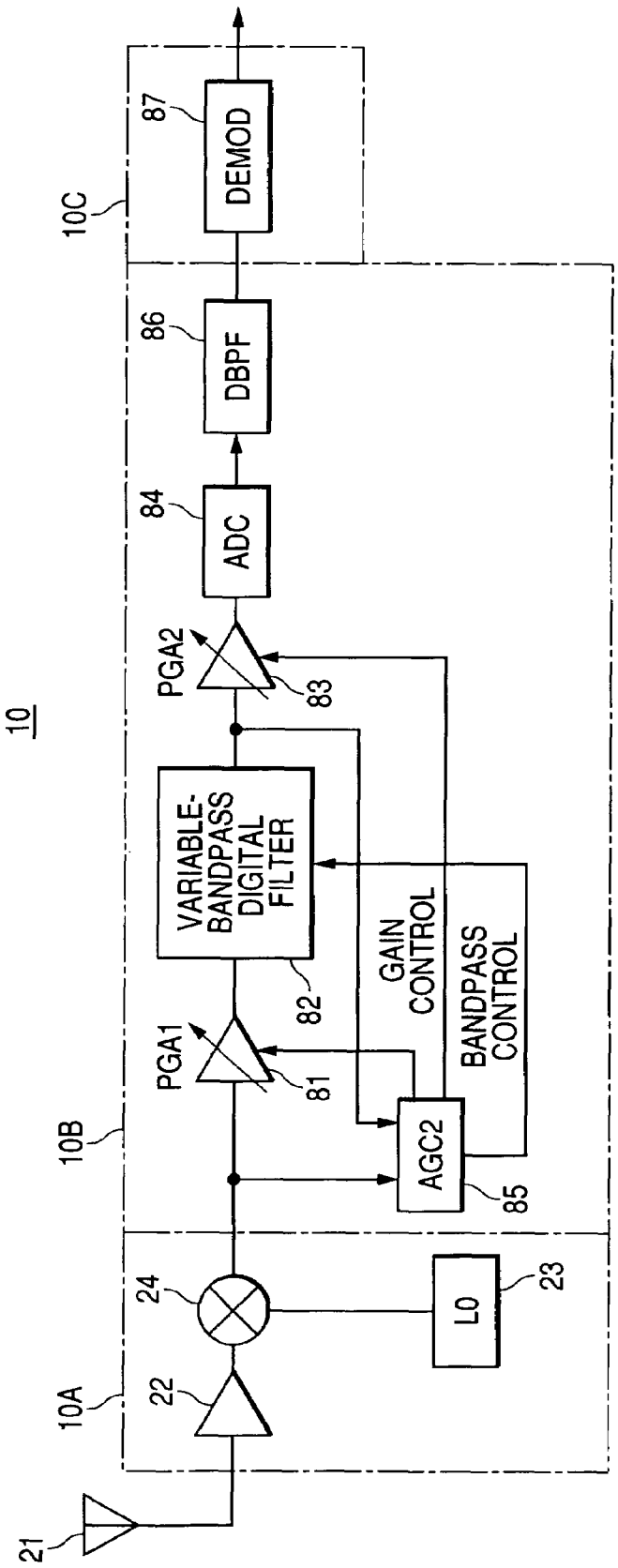

FILTER CONTROL METHOD, SIGNAL PROCESSING CIRCUIT AND INTEGRATED CIRCUIT FOR WIRELESS RECEIVER

CLAIM OF PRIORITY

The present application claims priority from Japanese application JP 2004-303887 filed on Oct. 19, 2004, the content of which is hereby incorporated by reference into this application.

FIELD OF THE INVENTION

The present invention relates to a method and an apparatus for controlling the passband of a filter in a receiver, and particularly to a method and an apparatus for controlling, with a simple structure, the passband of a filter that suppresses an interference wave in accordance with an incoming signal in an integrated circuit (hereinafter, abbreviated as IC) for a wireless receiver.

BACKGROUND OF THE INVENTION

In a conventional technique, a wireless receiver employs a configuration in which two bandpass filters are utilized in order to detect an adjacent interference wave (for example, see Japanese Patent Laid-Open No. 2004-72576).

SUMMARY OF THE INVENTION

FIG. 11 shows a general configuration of a wireless receiver having a Low-IF architecture. A high-frequency signal received by an antenna 21 is amplified by a low noise amplifier 22, and then mixed with a reference wave from a local oscillator circuit 23 by a mixer 24 so as to be converted to a low-frequency signal. Interference wave components of the low-frequency signal are suppressed to some extent by an analog filter 25, and then the low-frequency signal is amplified by a programmable gain amplifier 26 so that the signal amplitude is equal to the input dynamic range of an analog-digital converter 27. The signal output from the programmable gain amplifier 26 is converted to a binary value by the analog-digital converter 27, and then the interference wave components are sufficiently suppressed by a digital filter 28, so that the communications data is finally demodulated by a demodulator 29.

The amount of suppression by the analog filter 25 is usually determined on the basis of the resolution of the analog-digital converter 27, that is, the effective number of bits thereof. Specifically, when the effective number of bits is large, the amount of suppression by the analog filter 25 is not necessarily large. On the contrary, when the effective number of bits is small, the large amount of suppression by the analog filter 25 is necessary. This means that it is possible to increase desired wave components, which are supplied to the analog-digital converter 27, by suppressing the interference wave components included in the input signal to some extent with the analog filter 25. As a result, the effect caused by the quantization noise that is generated by the analog-digital converter 27 can be eased.

Here, the suppression of the interference wave by a fixed filter is described with reference to FIG. 12. In a conventional wireless communication system, there is a case that not only a desired wave but also an interference wave with several tens of decibels larger than the desired wave is simultaneously input. Therefore, in order to address such a case, a fixed filter that can enormously suppress a signal, namely, a fixed filter with a narrow passband is utilized in many cases. The suppression characteristics of the fixed filter are represented by a solid line in FIG. 12. As shown FIG. 12, not only the interference wave components but also the desired wave components are largely suppressed because the passband is narrow, which consequently causes a distortion in modulated data to thereby increase the bit error rates. In the case of such a fixed filter, even when a filtering function is not essentially required because of little interference wave components, a signal passes through the filter with a narrow passband, thus deteriorating the modulated data due to the above-mentioned passband limitation. As described above, there is a problem that the use of the fixed filter with a narrow passband causes deterioration in the desired wave signal and decrease in receiver sensitivity.

In a more sophisticated system, the amount of suppression by a filter, namely, the passband of a filter needs to be dynamically varied in accordance with magnitudes of interference wave components included in an incoming signal. Specifically, as shown in FIG. 13, in the case where the level of the interference wave is larger than a predetermined value, a filter A with a narrow passband is selected. On the contrary, in the case where the level of the interference wave is smaller than the predetermined value, a filter B with a broad passband is selected.

There is an apparatus described in the Japanese Patent Laid-Open No. 2004-72576 in which the passband of a filter is dynamically controlled. The example is shown in FIG. 14 where the level of the interference wave in an adjacent channel is detected by an adjacent interference wave detector 7 in an FM receiver, and a controller 8 controls the passband of an IF filter 1 on the basis of the detected result. The adjacent interference wave detector 7 is configured by using two bandpass filters for detection.

In a conventional method of controlling the passband of a filter, filters or detection circuits for extracting only an interference wave are required in order to determine the level of the interference wave, especially the level of the interference wave in an adjacent channel. This requirement has involved a problem that a circuit area is significantly increased, which results in increase in cost for a chip. For example, the adjacent interference wave detector described in the Japanese Patent Laid-Open No. 2004-72576 has a problem that the requirement of two bandpass filters for detection causes a significant increase in circuit area, which is unsuitable for an IC for wireless receiver to be employed.

The object of the present invention is to provide a method and an apparatus for controlling a filter in a wireless receiver which can solve the above-mentioned problem, can be manufactured at low cost, and can satisfy good receiver sensitivity and interference wave resistance.

Representative aspects of the present invention disclosed herein may be summarized as follows. That is, a filter control method for a wireless receiver which comprises at least a programmable gain amplifier, at least a variable-bandpass filter and an automatic gain control circuit for controlling a gain for the programmable gain amplifier so as to be an optimum value, wherein the passband of the variable-bandpass filter is controlled on the basis of a result obtained by detecting the amplitude level of a signal that has been input to the wireless receiver, said result being detected by said automatic gain control circuit.

In the present invention, the amplitude level of all the signals including the desired wave and the interference wave is detected as it is, to thereby control the passband of a filter on the basis of the result. The detection of the amplitude level is performed by utilizing the automatic gain control circuit that originally exists in the receiver.

BRIEF DESCRIPTION OF THE DRAWINGS

FIG. 6D is an explanatory diagram of an operation of the present invention assuming that a system employs Bluetooth to be used in a transceiver;

FIG. 7 is a block diagram showing a circuit configuration of a wireless receiver according to a second embodiment of the present invention;

DETAILED DESCRIPTION OF THE PREFERRED EMBODIMENTS

Figure 1:
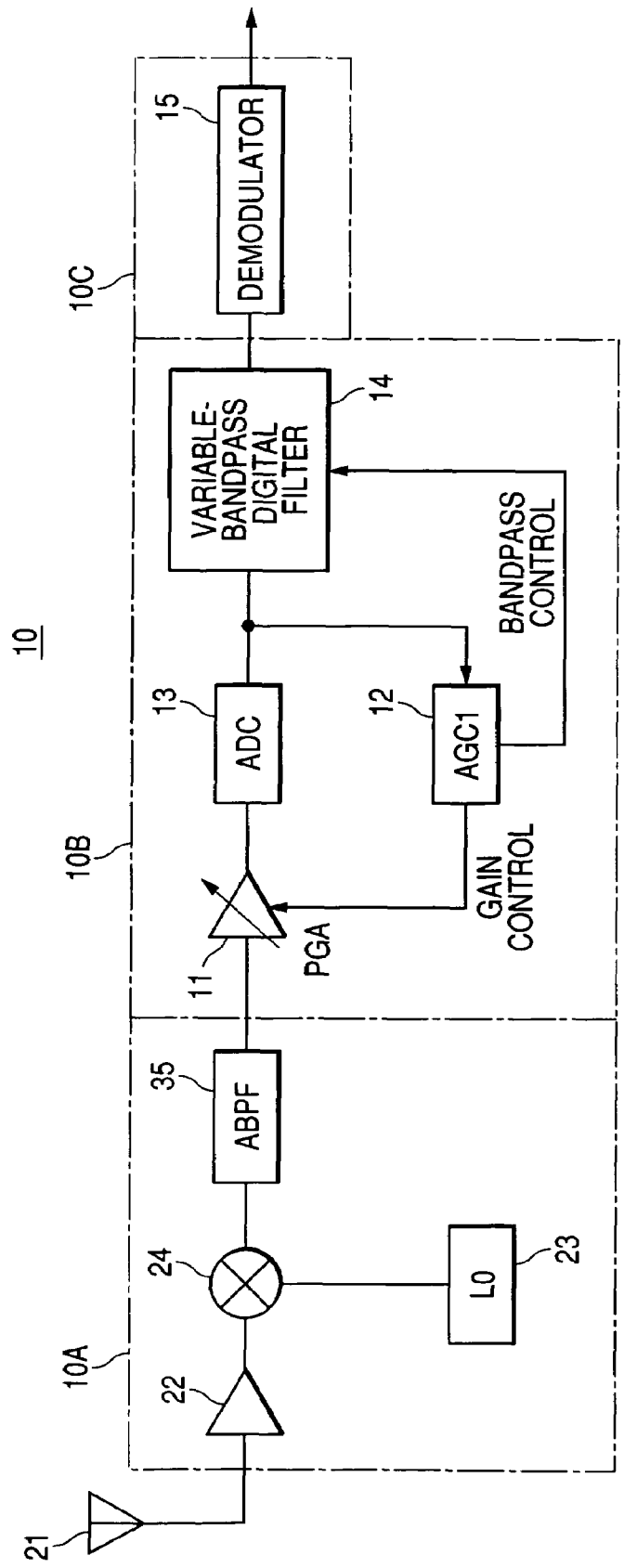
FIG. 1 is a block diagram showing a circuit configuration of a wireless receiver according to a first embodiment of the present invention.

FIG. 1 is a block diagram showing a circuit configuration of a wireless receiver having a Low-IF architecture according to a first embodiment of the present invention. This embodiment exemplifies a case in which an IC for wireless receiver having a variable-bandpass filter configured as a digital filter is applied to a transceiver. A circuit unit of the wireless receiver comprises a high-frequency signal processing unit 1A, a low-frequency signal processing unit 10B and a demodulation unit 10C. A high-frequency signal received by an antenna 21 is amplified by a low noise amplifier 22 in the high-frequency signal processing unit 10A, and then mixed with a reference wave from a local oscillator circuit (LO) 23 by a mixer 24 so as to be converted to a low-frequency signal. The low-frequency signal is supplied to a programmable gain amplifier (PGA) 11 in the low-frequency signal processing unit 10B through an analog filter (ABPF) 35.

A gain is set to the PGA 11 by a gain control signal from an automatic gain control circuit (AGC1) 12 so as to amplify the input signal supplied from the previous stage. An analog-digital converter (ADC) 13 serves to convert the output signal from the PGA 11 into a binary value. The AGC1 12 detects the amplitude level of the output from the ADC 13 to generate the gain control signal for the PGA 11. In addition thereto, the AGC1 12 has a function of controlling the passband of a variable-bandpass digital filter 14. Interference wave components included in the output from the ADC 13 are suppressed by the variable-bandpass digital filter 14 whose passband has been controlled, and the data is finally demodulated by a demodulator 15 in a demodulation unit 10C.

In the above-described configuration, a low pass filter or a bandpass filter with moderate characteristics enough to prevent the aliasing effect of the ADC 13 is used as the analog filter 35 in the previous stage of the PGA 11. Alternatively, this analog filter may be dislocated.

For wireless communications with the wireless receiver in this embodiment, for example, Bluetooth is utilized. Bluetooth uses the 2.45 GHz band, and performs communications in a bitrate of 1 Mbps or 2 Mbps.

Figure 2:
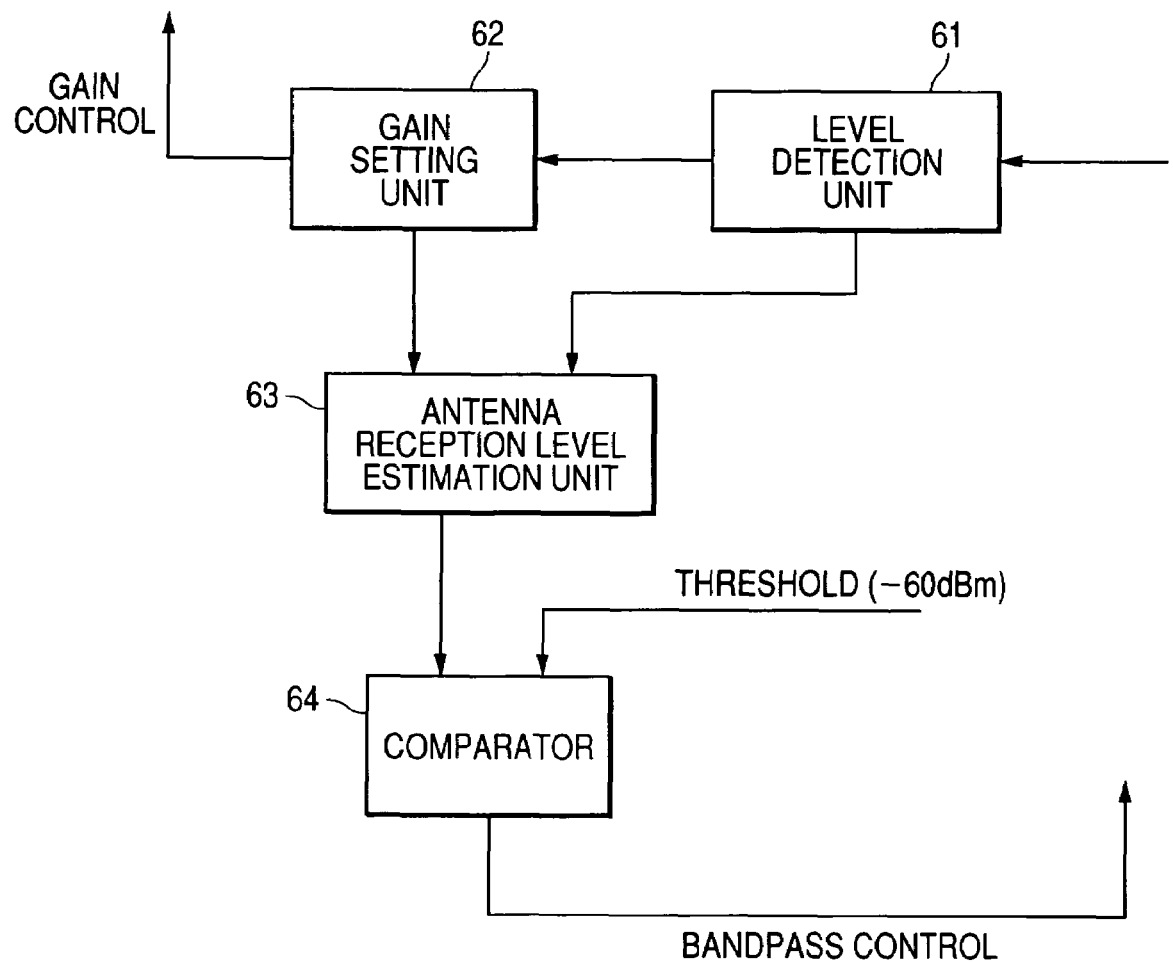
FIG. 2 is a diagram showing an example of an automatic gain control circuit according to the first embodiment.

FIG. 2 shows a specific example of a configuration of the AGC1 12 in FIG. 1. The output signal from the ADC 13 is supplied to the AGC1 12, and its amplitude level is detected by a level detection unit 61. A gain setting unit 62 sets an appropriate gain control signal on the basis of the result detected by the level detection unit 61. Further, an antenna reception level estimation unit 63 estimates the level of the received signal at an antenna input terminal on the basis of the current gain value held by the gain setting unit 62 and the result of the amplitude level detected by the level detection unit 61 at the time. The AGC1 12 is controlled by a clock signal or a frequency-divided clock signal generated by a clock signal generation circuit (not shown).

A comparator 64 compares the estimated level at the antenna input terminal that has been estimated by the antenna reception level estimation unit 63, with a predetermined threshold, for example, −60 dBm, and generates and outputs a bandpass control signal on the basis of the result. The passband or the amount of suppression of the variable-bandpass digital filter 14 is controlled by the bandpass control signal. For example, when the estimated level of the antenna reception is larger than the threshold, the passband of the variable-bandpass digital filter 14 is made narrow. On the contrary, when the estimated level of the antenna reception is smaller than the threshold, the passband of the variable-bandpass digital filter 14 is made broad.

The variable-bandpass digital filter 14 may be realized by a digital filter with a configuration in which, for example, the tap coefficients or the number of tap stages can be varied.

Figure 3:
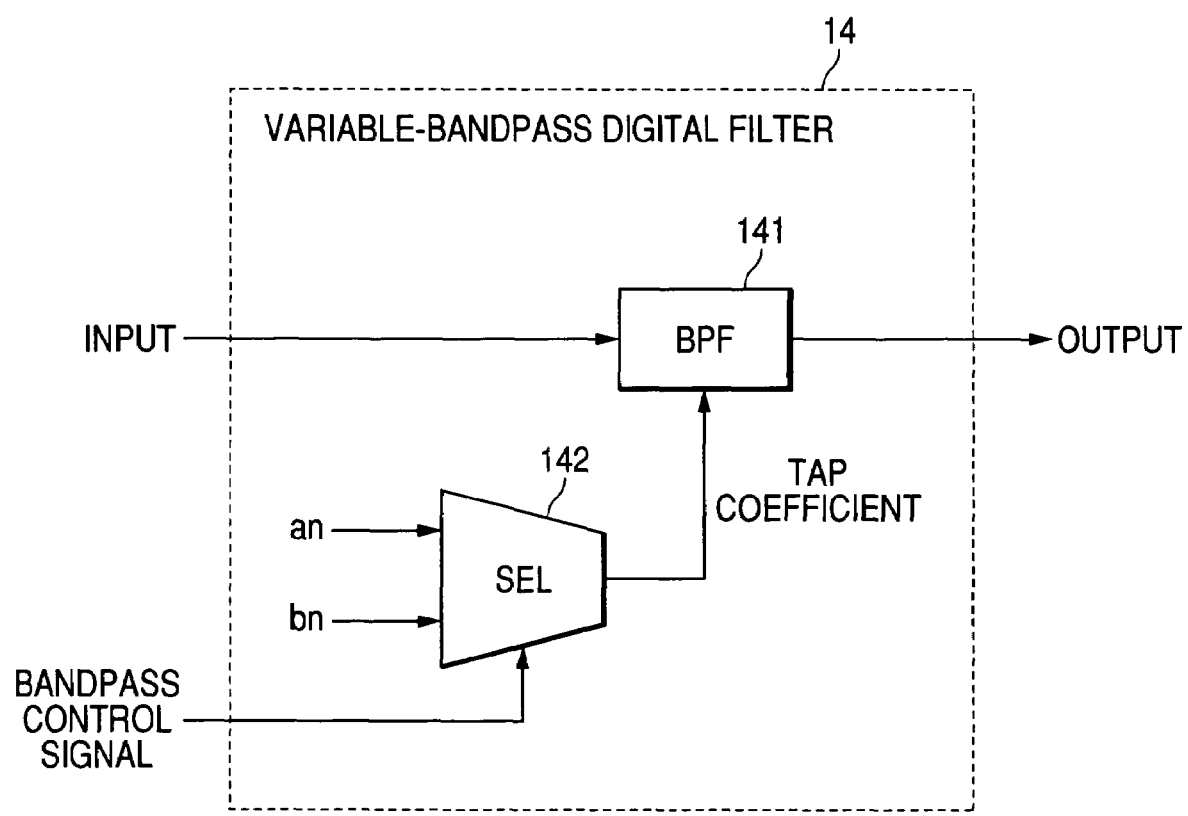
FIG. 3 is a diagram showing a specific example of a configuration of a variable-bandpass digital filter in FIG. 2.

FIG. 3 shows a specific example of a configuration of the variable-bandpass digital filter 14 shown in FIG. 2. A bandpass filter 141 employs a two-stages configuration of the second-order IIR filters and is given two kinds of tap coefficients (an, bn) for narrow band and broadband. Either of the tap coefficients for narrow band and broadband is selected on the basis of the bandpass control signal output from the comparator 64. Alternatively, the number of tap stages may be switched by using the bandpass control signal.

Figure 4:
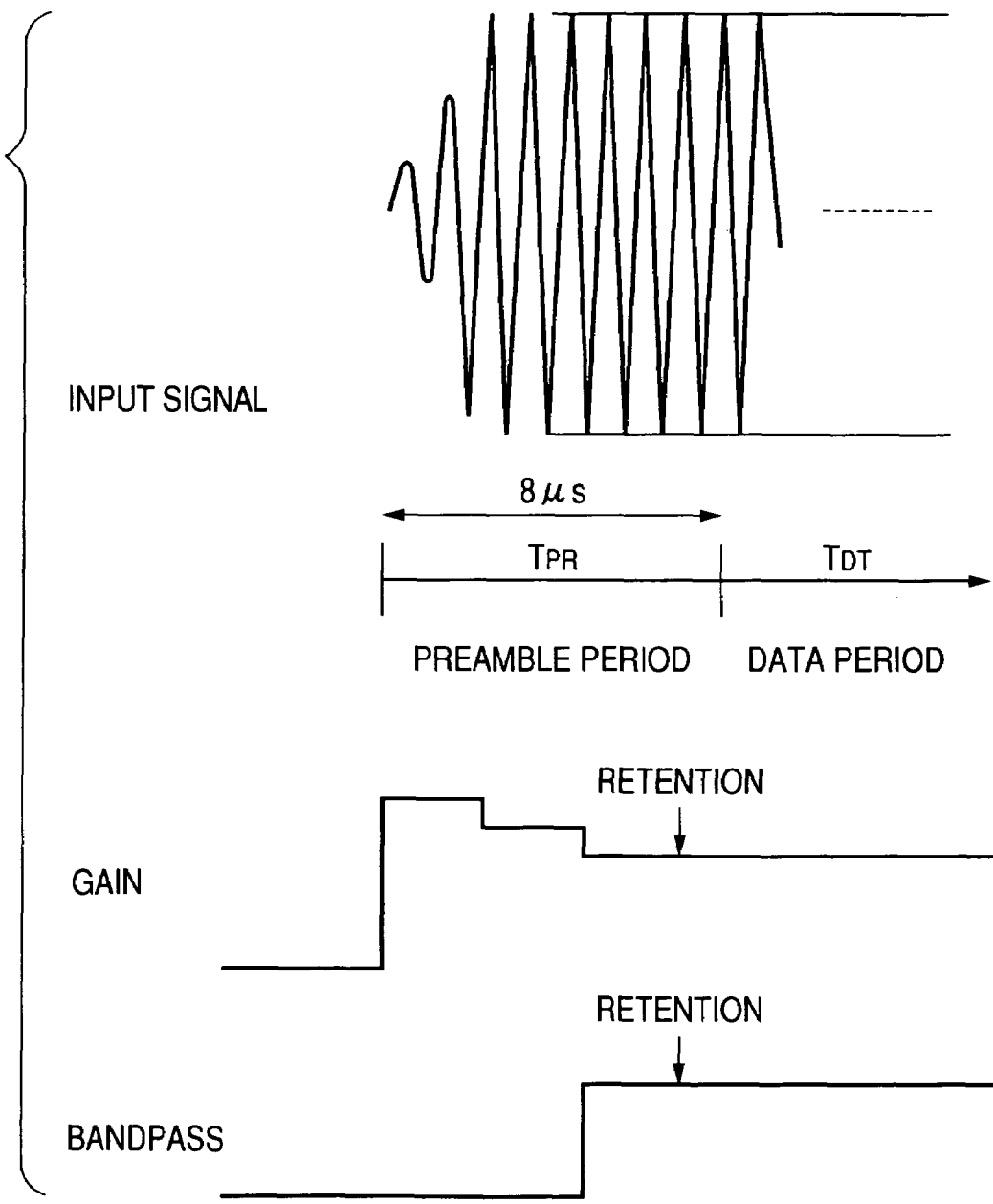
FIG. 4 is a diagram showing an example of a time chart representing an operation of the automatic gain control circuit according to the first embodiment of the present invention.

FIG. 4 shows an example of a time chart representing an operation of the AGC1 12. Bluetooth uses the 2.45 GHz band, and the waveform of the input signal is composed of the preamble period TPr and the subsequent data period TDt. As an example, the preamble period TPr has the signal rise time of about 4 μs and the subsequent time of about 4 μs after the rise of the signal, thus totaling 8 μs.

In this embodiment, the AGC1 12 detects the level of the input signal, that is, the incoming signal including a desired wave and an interference wave, and during the preamble period after the rise of the signal, the AGC1 12 determines a gain and a bandwidth of the input signal and sets the gain for the PGA 11 and the bandwidth of the variable-bandpass digital filter 14. In the initial stage-of the preamble period, the amplitude of the signal is so small that the gain is set to the maximum value as default. Switching of the gain is sequentially repeated until the AGC1 12 determines that the level of the input signal that is supplied to the ADC 13 reaches the maximum value within the dynamic range of the ADC 13. The set gain and bandwidth are kept throughout the data period TDt of the input signal.

The significant feature of the present invention is that the amplitude level of the incoming signals including the desired wave and the interference wave is detected as it is, unlike the conventional example in which only the level of the interference wave is detected by separating the interference wave with circuits or filters for detection of the interference wave. The detection of the amplitude level is performed by utilizing the AGC1 that originally exists in the receiver. Accordingly, there is no need for newly adding circuits or filters for detection of the interference wave as in the conventional example, thus realizing the substantial reduction in circuit scale.

Figure 5:
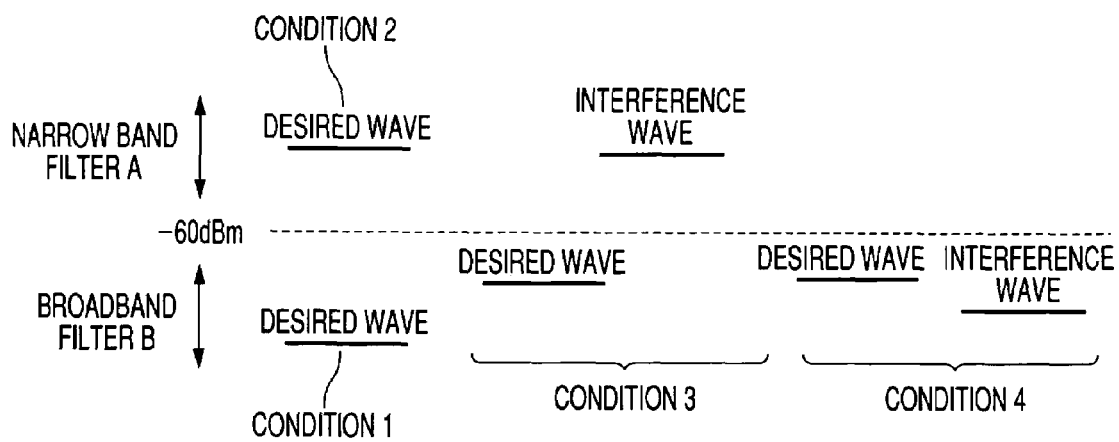
FIG. 5 is a diagram explaining the effectiveness of the present invention.
Figure 6A:
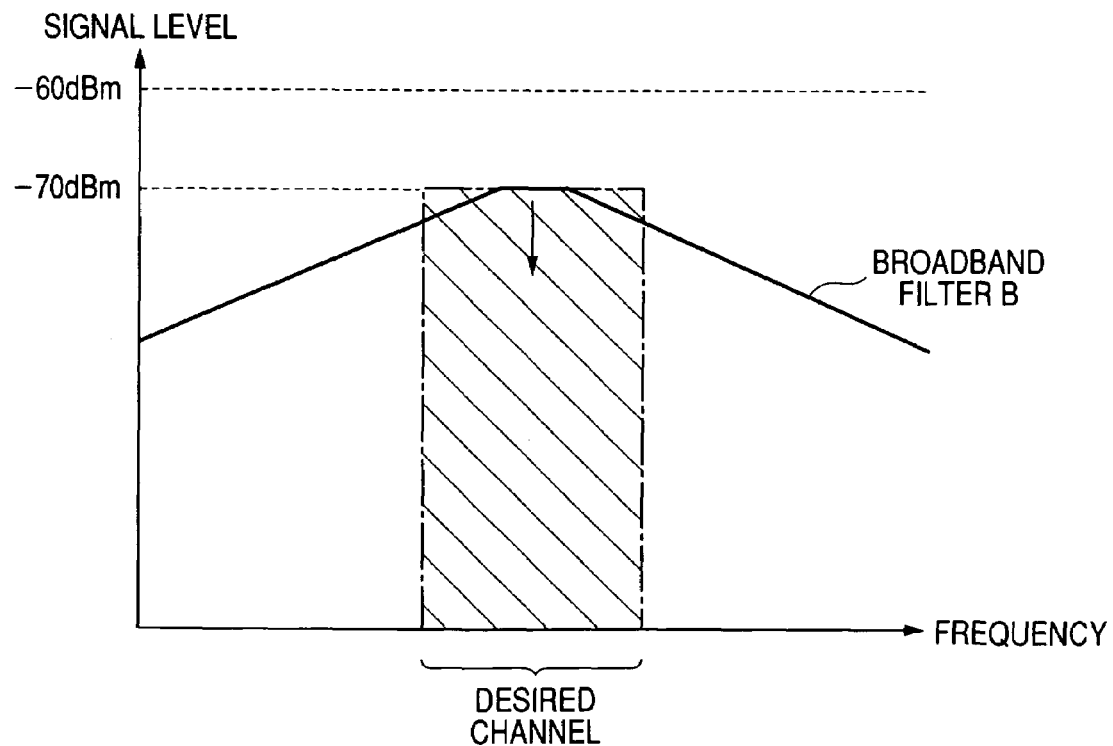
FIG. 6A is an explanatory diagram of an operation of the present invention assuming that a system employs Bluetooth to be used in a transceiver.
Figure 6B:
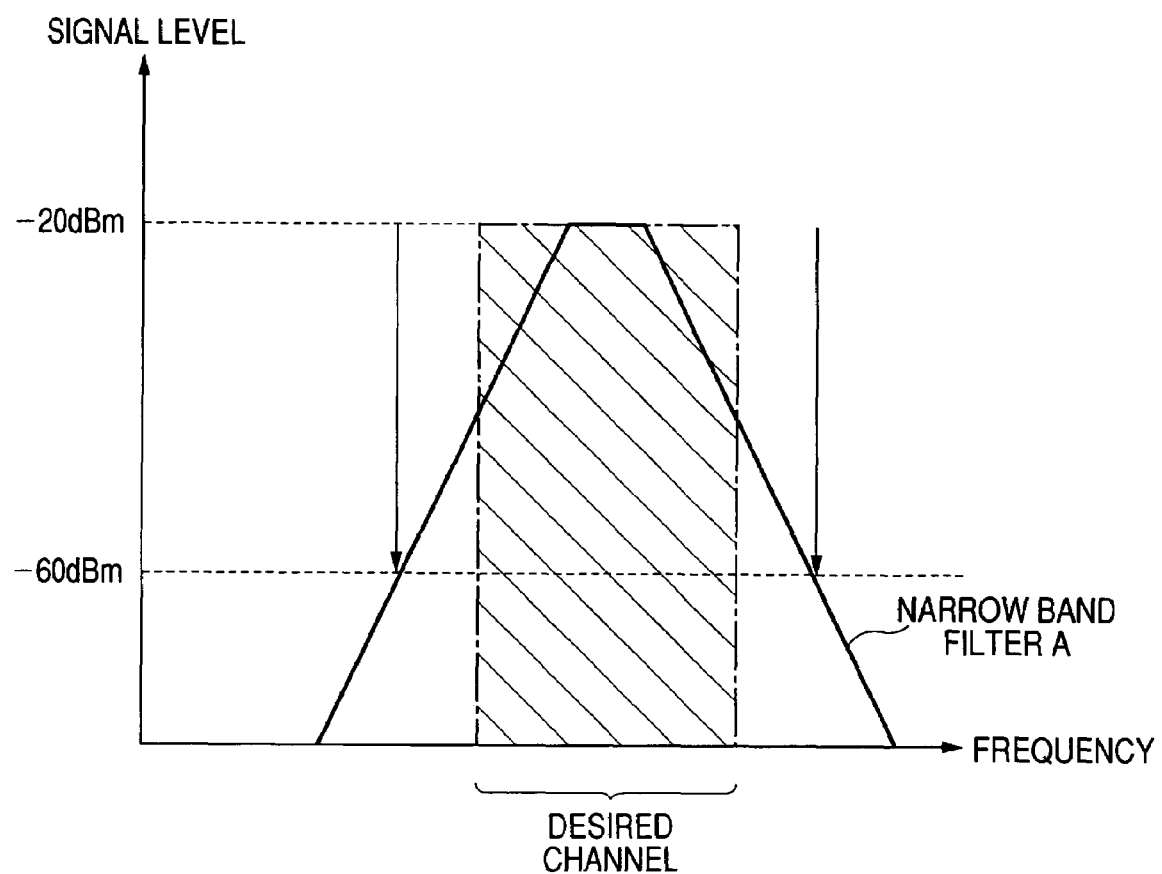
FIG. 6B is an explanatory diagram of an operation of the present invention assuming that a system employs Bluetooth to be used in a transceiver.
Figure 6C:
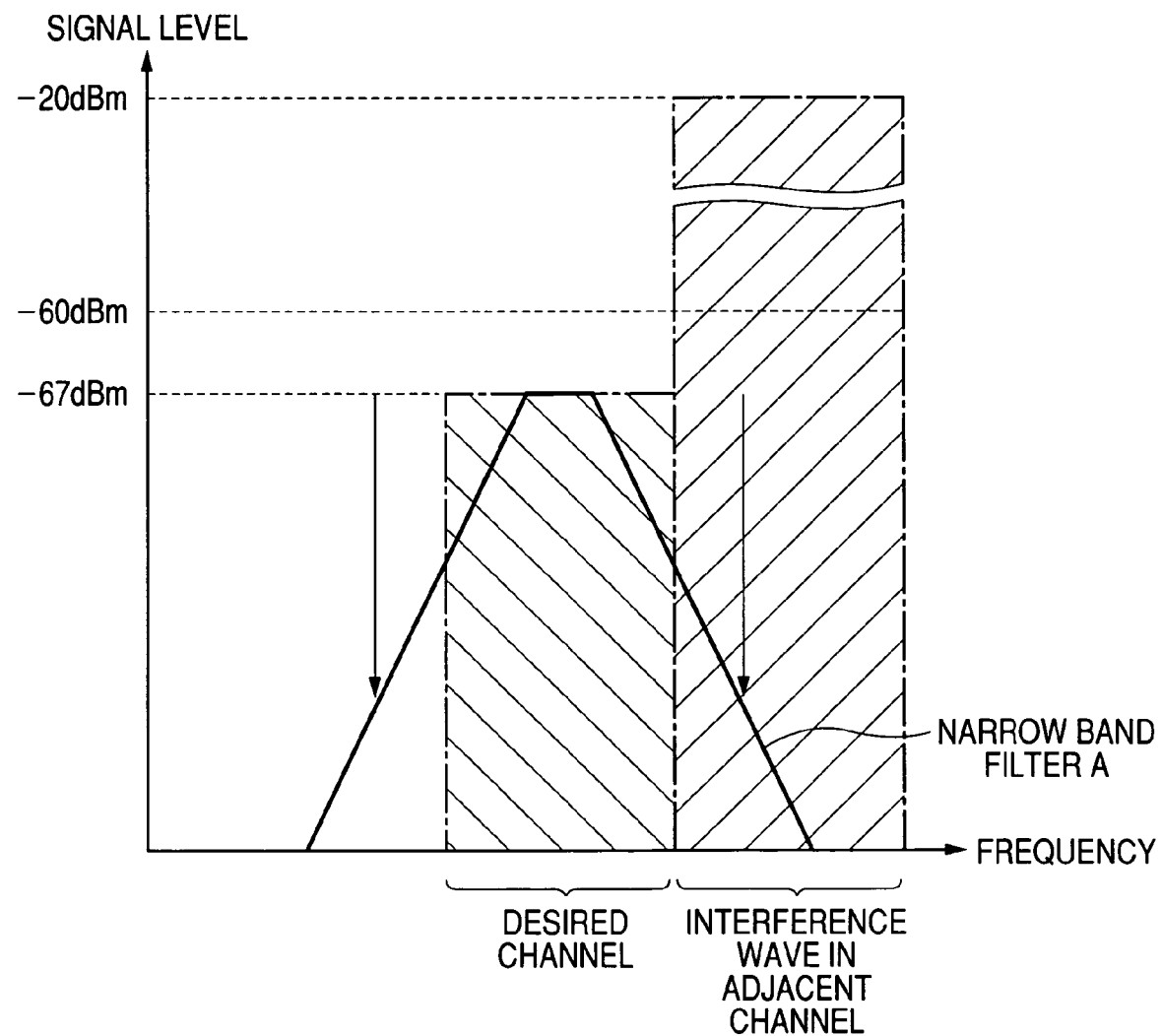
FIG. 6C is an explanatory diagram of an operation of the present invention assuming that a system employs Bluetooth to be used in a transceiver.

Next, with reference to FIGS. 5 and 6, the effectiveness of the present invention will be described under the respective conditions of input signals in a system which assumes that Bluetooth used for a transceiver is employed as an example of typical wireless system. FIG. 5 shows the conditions of input signals on the basis of the relationship between desired waves and interference waves. FIGS. 6A to 6D are diagrams of an operational explanation.

In the case where the input signal includes no interference wave, it is required for a system employing Bluetooth to receive a desired wave with about −70 dBm. However, in the case where the input signal includes an interference wave, a system employing Bluetooth is acceptable if it can receive a desired wave with about −60 dBm. For the sake of simple explanation, the variable-bandpass digital filter 14 may be switched between two kinds of filters, that is, a narrow band filter A and a broadband filter B by switching the tap coefficients or the number of tap stages. The threshold used when comparing the estimated level of the antenna reception in FIG. 2 is assumed as −60 dBm.

First, as shown in the condition 1 in FIG. 5, when the input signal includes no interference wave and a desired wave with a level smaller than −60 dBm of the threshold, the broadband filter B is selected. Accordingly, since the suppression of the desired wave can be prevented as shown in FIG. 6A, even in the case of inputting the desired wave with a level of about −70 dBm, the distortion of the modulated data can be suppressed to thereby decrease the bit error rates, which means the improvement in minimum receiver sensitivity.

Further, as shown in the condition 2, when the input signal includes no interference wave and a desired wave with a level larger than the threshold, the narrow band filter A is selected. In this case, since the degree of suppression of the desired wave is increased as shown in FIG. 6B, the modulated data is largely distorted. However, the signal-to-noise ratio is still high as the level of the desired wave is relatively large, for example, −20 dBm, which causes no problems.

As shown in the condition 3, the input signal includes a high level of an interference wave in addition to a desired wave, and as a result, the level of all the input signals including the desired wave and the interference wave becomes larger than −60 dBm. In this case, since the narrow band filter A that largely suppresses the signal is selected, the interference wave is sufficiently suppressed. According to typical wireless systems as well as Bluetooth, as shown in FIG. 6C, the input level of the desired wave in the presence of the interference wave with a level of about −20 dBm is, for example, −67 dBm which is at least 3 dBm larger than −70 dBm, which causes no problems in the signal-to-noise ratio. Although bit errors largely depend on the ratio of desired waves to interference waves, the selection of the narrow band filter lessens the effect of bit errors. Further, since the signal-to-noise ratio is still high, the distortion of the modulated data due to the narrow band filter does not matter.

As shown in the condition 4, a desired wave with a level of, for example, −67 dBm and an interference wave with a level of, for example, −62 dBm are simultaneously input, and as a result, the level of all the input signals including the desired wave and the interference wave becomes smaller than −60 dBm. In this case, the broadband filter B that suppresses less the signal is selected. As described above, in typical wireless systems employing, for example, Bluetooth, the level of the desired wave in the presence of the interference wave is relatively high. In the presence of the interference wave, the input level of the desired wave is expected to become larger than −67 dBm. Accordingly, the ratio of the interference wave to the desired wave is not so large that no problem arises in the signal-to-noise ratio and the broadband filter that suppresses less the signal suffices. In the condition 4, as the level of the interference wave is originally small, the selection of the broadband filter causes no problems.

According to the first embodiment of the present invention as described above, only the amplitude level of all the input signals including the desired wave and the interference wave is detected in order to determine the bandwidth of the filter. However, the bandwidth of the filter can be controlled without problems under the respective conditions, and further, the minimum receiver sensitivity is especially improved. Furthermore, although the employment of a feed forward system with no filter in the loop makes the responsiveness excellent, a feedback system may be employed.

According to the first embodiment of the present invention, it is possible to appropriately control the passband of a filter without newly adding circuits or filters for detection of the interference wave in a wireless receiver, thus realizing the substantial reduction in circuit scale. As a result, there can be realized an IC for wireless receiver which can be manufactured at low cost and has a good receiver sensitivity and interference wave resistance.

In other words, according to the first embodiment of the present invention, a simple configuration of circuits allows for appropriately controlling the passband of a filter, and thus there is no need for newly adding circuits or filters for detection of the interference wave. Accordingly, there can be realized an IC for wireless receiver with a circuit scale reduced which can be manufactured at low cost and has a good receiver sensitivity and interference wave resistance.

Further, this embodiment is suitable for a case in which the ADC 13 has such a high resolution that the quantization noise causes no problem to the ADC 13. In this embodiment, it is not necessary to employ an analog filter having a large area and large variation in time constant.

Next, the second embodiment of the present invention will be described with reference to FIGS. 7 to 10. In FIG. 7, a circuit unit of a wireless receiver comprises a high-frequency signal processing unit 10A, a low-frequency signal processing unit 10B and a demodulation unit 10C. PGAs 81, 83 of the low-frequency signal processing unit 10B amplify the input signal by a gain that is set by an AGC2 85. A variable-bandpass analog filter 82 serves to suppress interference wave components included in the output signal from the PGA1 81, and the passband or the amount of suppression is controlled by the AGC2 85. Further, an ADC 84 converts the output signal from the PGA2 83 into a binary value.

Here, the PGA1 81 is installed in order to reduce a relatively large noise that is generated by the variable-bandpass analog filter 82. The PGA2 83 serves to adjust the amplitude level of the signal so as to be equal to the input dynamic range of the ADC 84.

The signal output from the PGA2 83 is converted into a binary value by the ADC 84, and then the interference wave components of the signal are sufficiently suppressed by a digital filter 86, so that the communications data is finally demodulated by a demodulator 87. The digital filter 86 with moderate bandpass characteristics may be employed, or may be dislocated.

Figure 8:
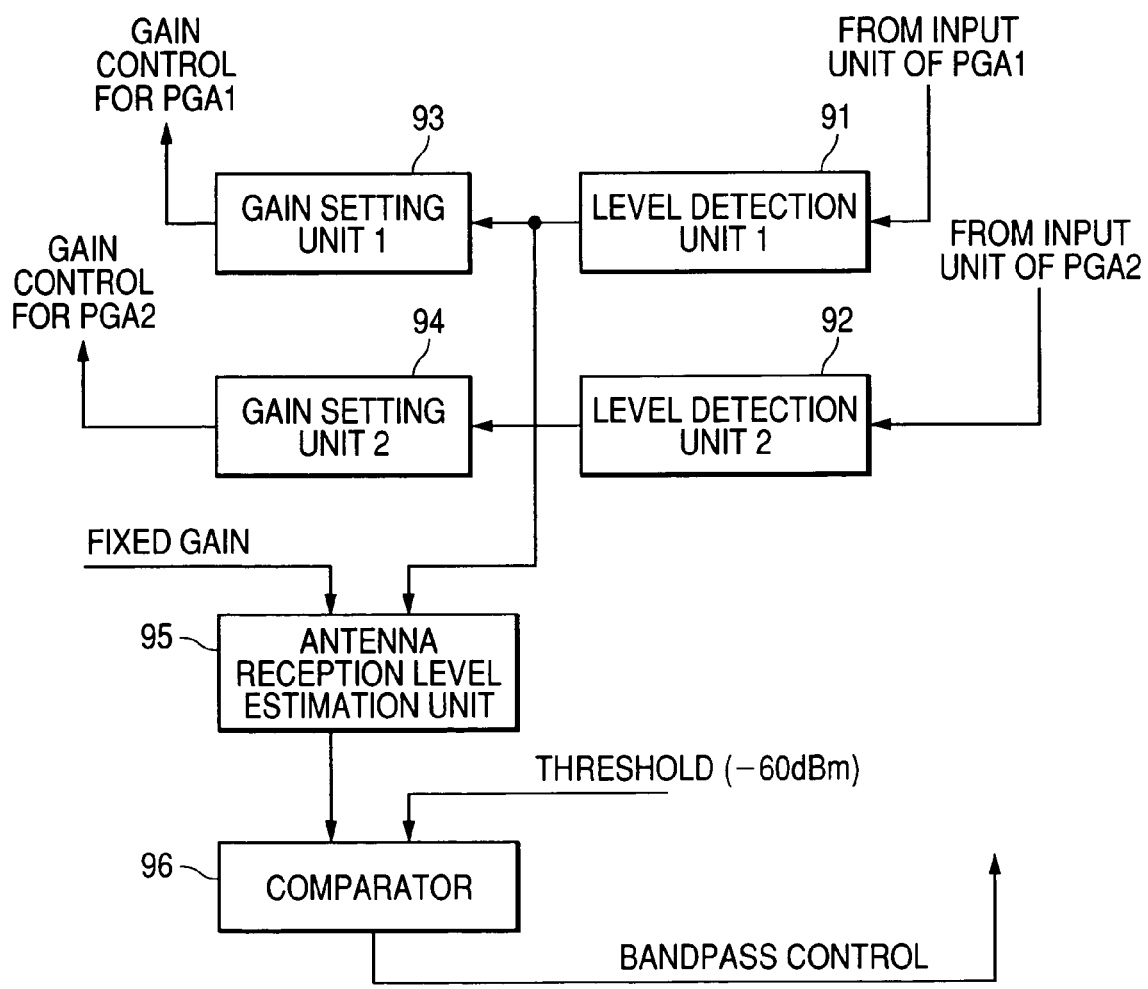
FIG. 8 is a diagram showing an example of an automatic gain control circuit according to the second embodiment.

FIG. 8 shows an example of the AGC2 85 according to the second embodiment. The input amplitude levels of the PGAs 81, 83 are respectively detected by level detection units 91, 92. Each of gain setting units 93, 94 sets an optimum gain for each of the PGAs 81, 83 on the basis of the results detected by the level detection units 91, 92. At the same time, the result detected by the level detection unit 91 is input to an antenna reception level estimation unit 95. The antenna reception level estimation unit 95 estimates the reception level of the signal at an input terminal of an antenna on the basis of the result detected by the level detection unit 91 and a fixed gain that has been set in advance. The fixed gain is a sum of gains in previous stages, corresponds to the current gain value held by the gain setting unit and is given at the time of designing the apparatus.

A comparator 96 compares the level of the antenna reception estimated by the antenna reception level estimation unit 95, with a predetermined threshold, for example, −60 dBm, and generates and outputs a bandpass control signal on the basis of the result. The passband or the amount of suppression of the variable-bandpass analog filter 82 is controlled by the bandpass control signal. For example, when the estimated level of the antenna reception is larger than the threshold, the passband of the variable-bandpass analog filter 82 is made narrow. On the contrary, when the estimated level of the antenna reception is smaller than the threshold, the passband of the variable-bandpass analog filter 82 is made broad.

The variable-bandpass analog filter 82 can be realized in a configuration where, for example, the bandpass control signal allows for switching of time constants or the number of filter stages, or selection from a group of filters with a plurality of passbands.

Figure 9:
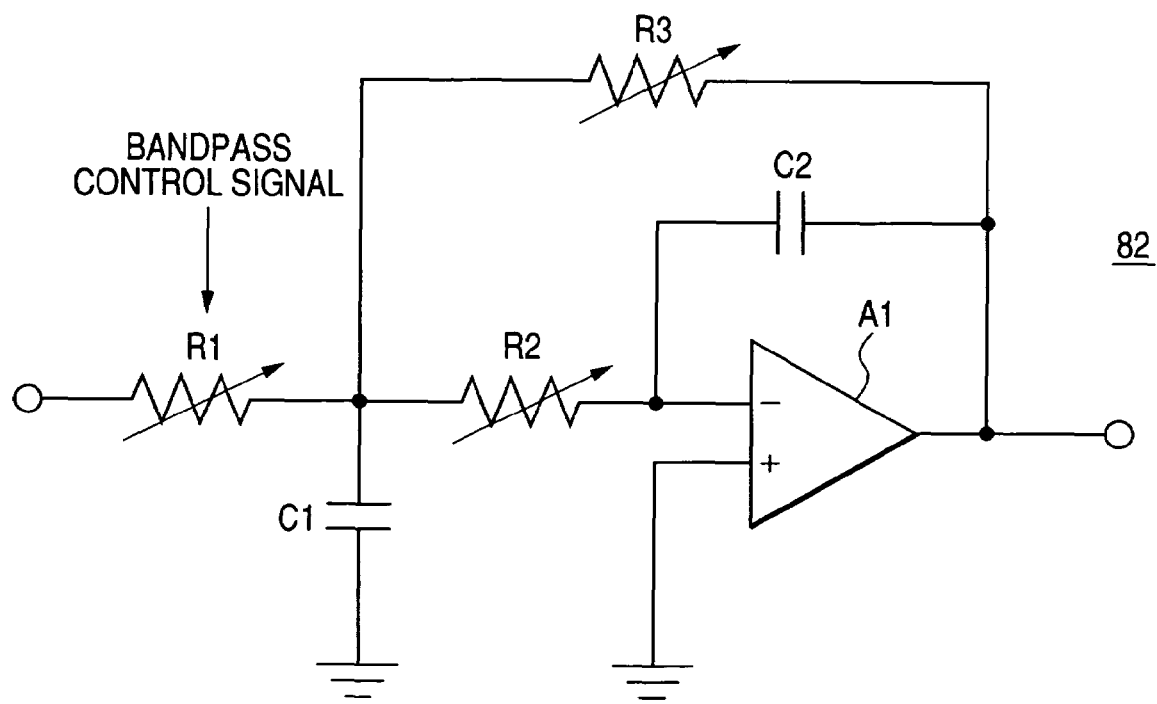
FIG. 9 is a diagram showing a specific example of a configuration of a variable-bandpass analog filter in FIG. 8.

FIG. 9 shows a specific example of a circuit configuration of the variable-bandpass analog filter. This circuit employs the second-order RC LPF that is configured by resistances R1, R2, R3, capacitances C1, C2, and an operational amplifier A1. Any one of the resistances R1, R2 and R3 is adjusted by the bandpass control signal.

Figure 10:
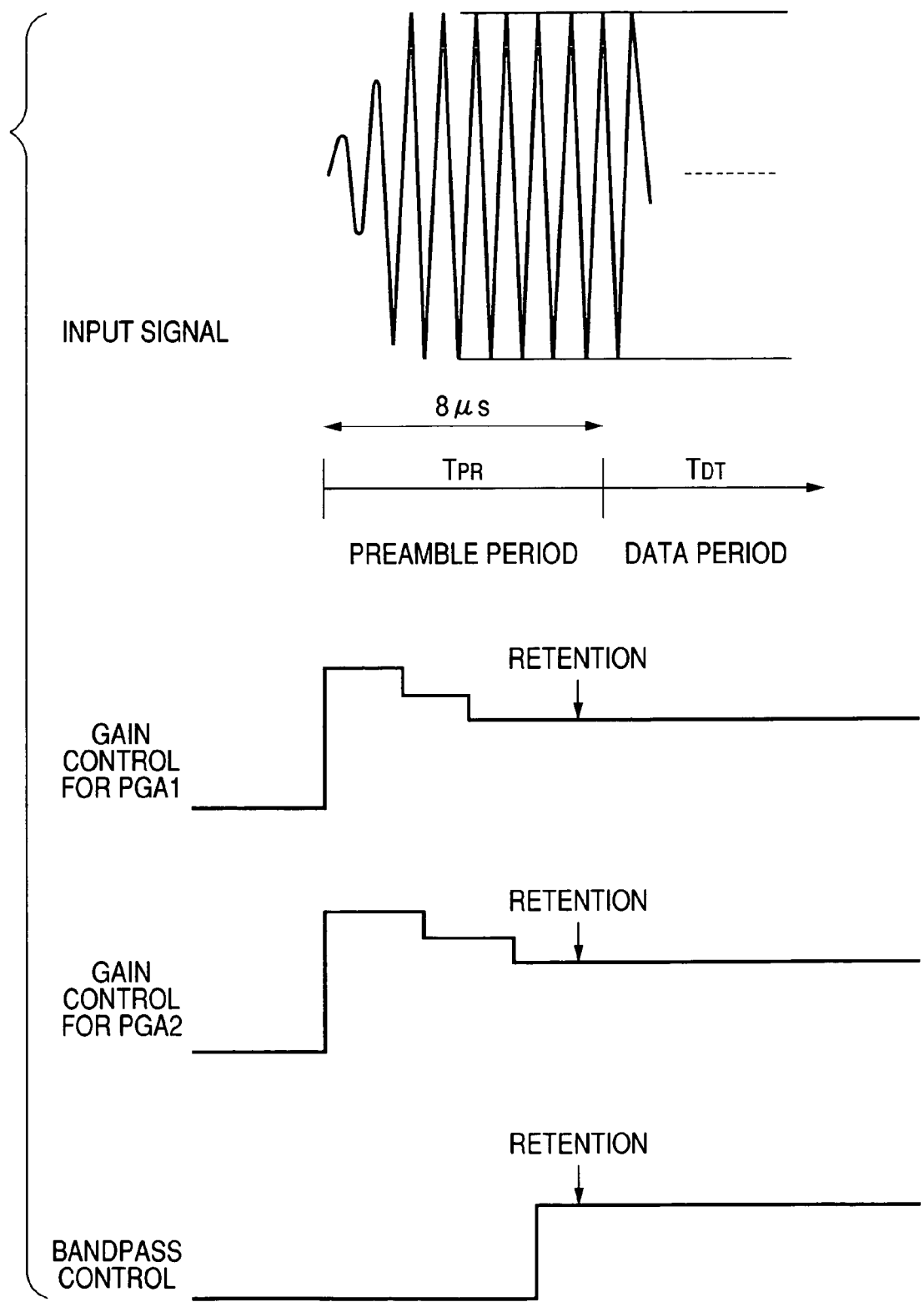
FIG. 10 is a diagram showing an example of a time chart representing an operation of the automatic gain control circuit according to the second embodiment.
Figure 11:
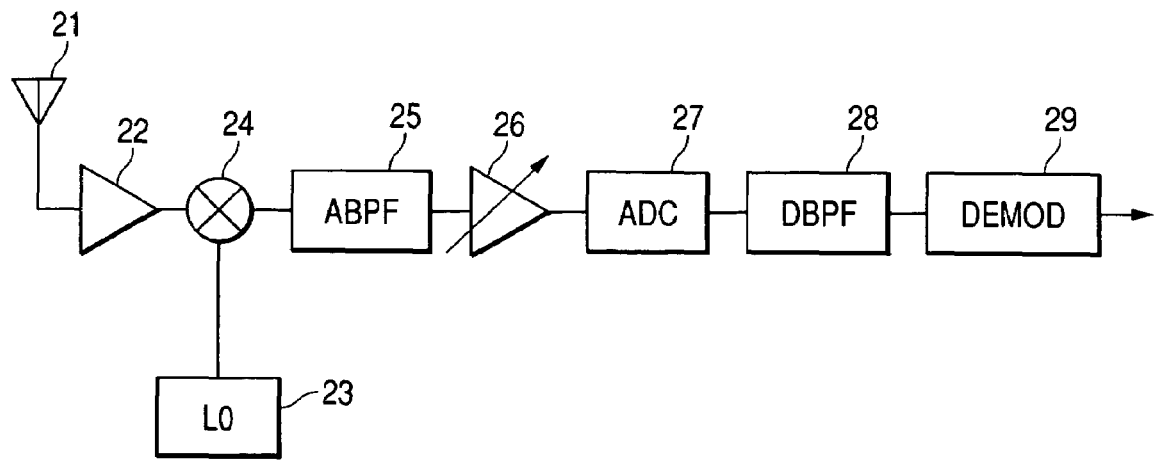
FIG. 11 is a diagram showing a configuration of a conventional receiver of a wireless system.
Figure 12:
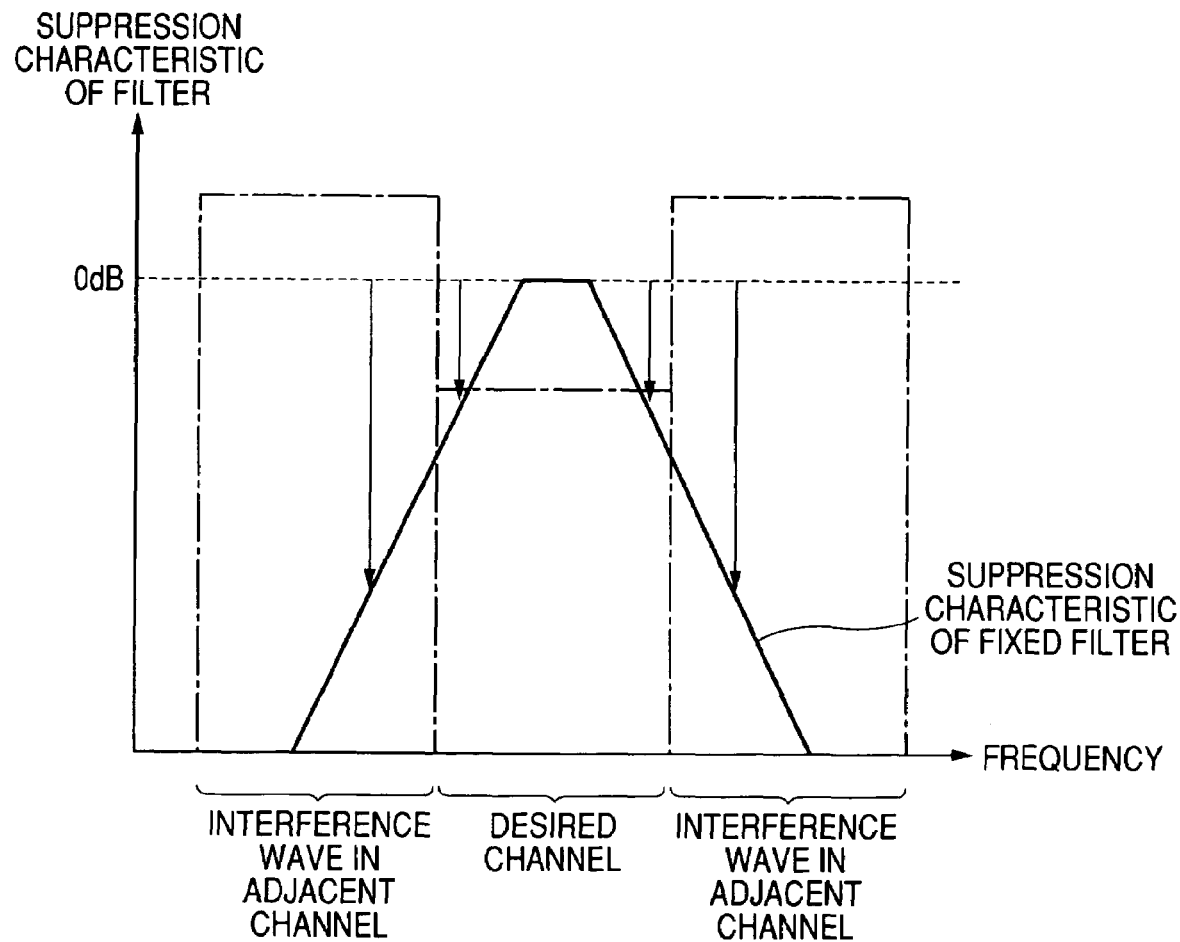
FIG. 12 is an explanatory diagram of the suppression of an interference wave by a fixed filter.
Figure 13:
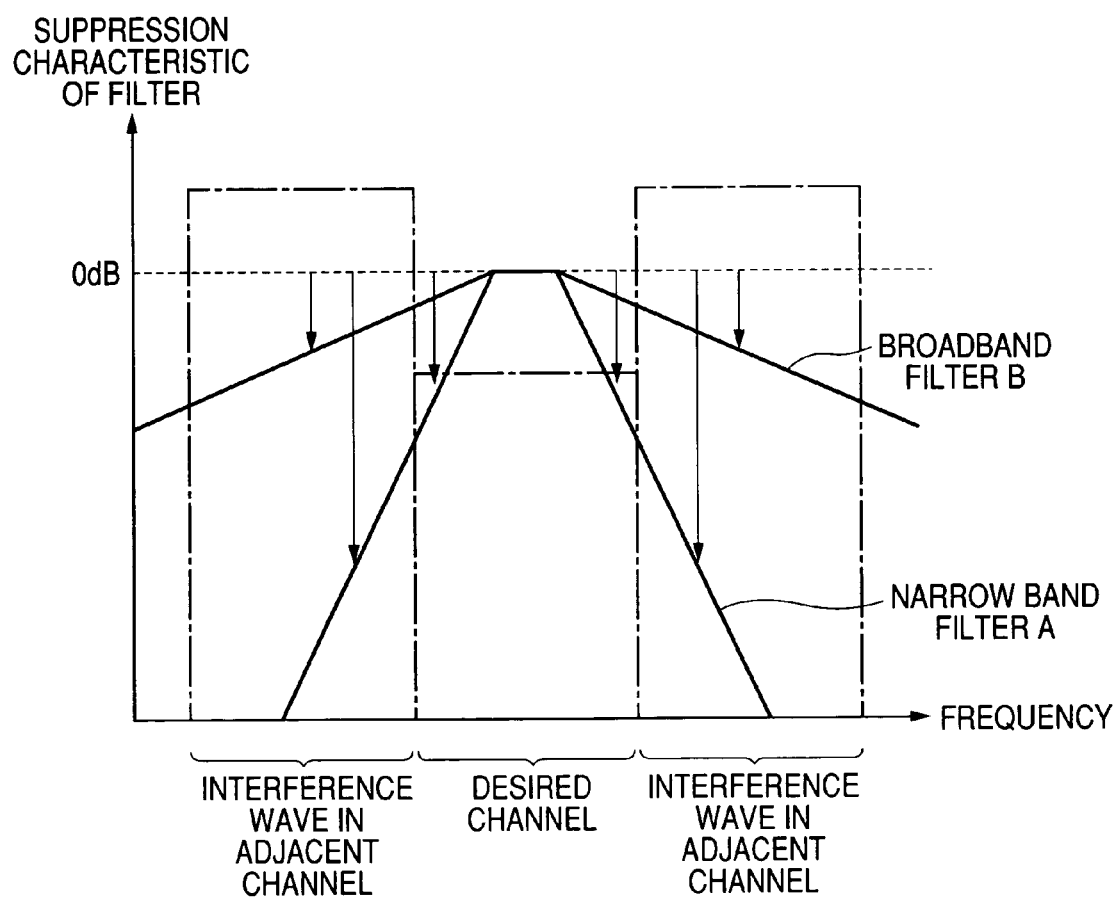
FIG. 13 is an explanatory diagram of the suppression of an interference wave by switching the passband of a filter.
Figure 14:
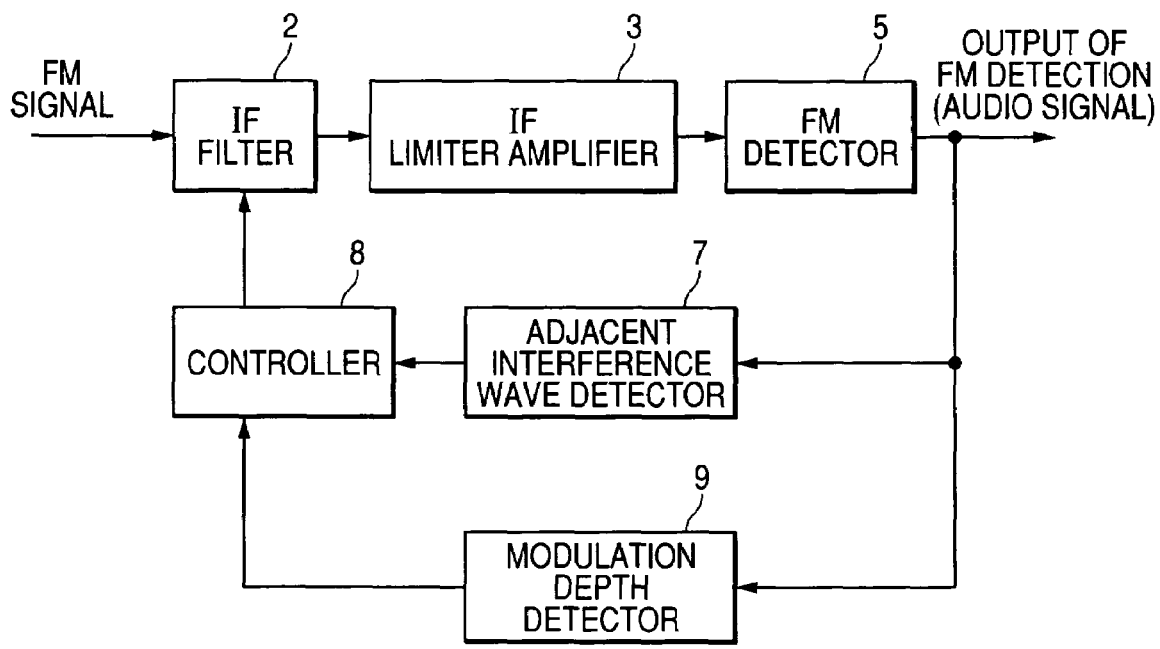
FIG. 14 is a diagram showing a conventional method of switching a filter.

FIG. 10 shows a time chart illustrating an operation of the AGC2 85.

In the second embodiment, during the preamble period of the input signal, that is, all the signals including the desired wave and the interference wave, the AGC2 85 detects the level of the input signal, determines a gain and a bandwidth, and sets the appropriate gains for the PGAs 81, 83 as well as the bandwidth of the variable-bandpass analog filter 82. The set gains and bandwidth are kept throughout the data period of the input signal.

In the second embodiment, the passband or the amount of suppression of the variable-bandpass analog filter 82 is controlled on the basis of the relationship between desired waves and interference waves as shown in FIG. 5.

In the second embodiment, as similar to the first embodiment, the amplitude level of all the signals including the desired wave and the interference wave is detected as it is, unlike the conventional example in which only the level of the interference wave is detected. The detection of the amplitude level is performed by utilizing the AGC2 that originally exists in the receiver, and accordingly, there is no need for newly adding circuits or filters for detection of the interference wave.

According to the second embodiment, it is possible to appropriately control the passband of a filter without newly adding circuits or filters for detection of the interference wave in a wireless receiver, thus realizing the substantial reduction in circuit scale. As a result, there can be realized an IC for wireless receiver which can be manufactured at low cost and has good receiver sensitivity and interference wave resistance. Accordingly, there can be realized an IC for wireless receiver with a circuit scale reduced which can be manufactured at low cost and has good receiver sensitivity and interference wave resistance.

The second embodiment is effective in a case where the ADC 84 with a high resolution, which assists the suppression of interference waves, cannot be employed due to conditions in manufacturing processes for IC and the like.

The second embodiment is applicable to an arbitrary configuration, different from the above-mentioned configuration shown in FIG. 7, in which, for example, the arbitrary number of stages of the PGAs, the arbitrary number of stages of the variable-bandpass analog filters, or a combination of these arbitrary orders is employed, The present invention is not limited to the system employing Bluetooth that has been described in the embodiments, but is applicable to the general systems which control the passband of a filter of a receiver in typical wireless systems. The present invention is also applicable to, for example, a wireless LAN and HomeRF.

According to the present invention, it is possible to appropriately control the passband of a filter in a wireless receiver without newly adding circuits or filters for detection of the interference wave.

What is claimed is:

1. A filter control method for a wireless receiver which comprises a programmable gain amplifier, a variable-bandpass filter, and an automatic gain control circuit to control a gain of the programmable gain amplifier an optimum value, the method comprising the steps of:
    detecting an amplitude level of a signal input to the wireless receiver using said automatic gain control circuit, and
    controlling a passband width of the variable-bandpass filter based on the detected amplitude level of the signal.

2. The filter control method for a wireless receiver according to claim 1, further comprising the steps of:
    comparing an estimated value of an antenna reception level of the wireless receiver, using the automatic gain control circuit, with a predetermined value that has been set in advance;
    generating a bandpass control signal to control the variable-bandpass filter so that the passband width of the variable-bandpass filter is made narrower when said estimated value of the antenna reception level is larger than the predetermined value; and
    generating a bandpass control signal to control the variable-bandpass filter so that the passband width of the variable-bandpass filter is made broader when said estimated value of the antenna reception level is smaller than the predetermined value.

3. The filter control method for a wireless receiver according to claim 1,
wherein said detecting the amplitude level of the signal includes detecting a desired wave of the signal and an interference wave of the signal to control the passband width of the variable-bandpass filter.

4. The filter control method for a wireless receiver according to claim 1,
wherein the automatic gain control circuit includes a level detection unit, a gain setting unit, an antenna reception level estimation unit, and a comparator, and
the method further comprising the steps of:
detecting the amplitude level of the input signal using said level detection unit;
setting an optimum gain for the programmable gain amplifier using said gain setting unit based on the amplitude level detected by said level detection unit;
estimating an amplitude level of the input signal at an antenna terminal using said antenna reception level estimation unit based on the amplitude level detected by the level detection unit and a gain value held by the gain setting unit;
comparing the estimated amplitude level of the antenna reception level estimation unit with a predetermined value that has been set in advance by said comparator; and
controlling said passband width of the variable-bandpass filter, wherein, when said estimated amplitude level of the antenna reception level estimation unit is larger than the predetermined value, a bandpass control signal is generated so that the passband width of the variable-bandpass filter is made narrower, and, wherein, when said estimated amplitude level of the antenna reception level estimation unit is smaller than the predetermined value, said bandpass control signal is generated so that the passband width of the variable-bandpass filter is made broader.

5. The filter control method for a wireless receiver according to claim 4, wherein the predetermined value set in advance is a fixed gain that has been set in advance based on a sum of gains in previous stages of the automatic gain control circuit.

6. The filter control method for a wireless receiver according to claim 1,
wherein the variable-bandpass filter is configured as a digital filter, and
the method further comprising the step of:
controlling said passband width of the digital filter by switching one of a tap coefficient and a number of tap stages.

7. The filter control method for a wireless receiver according to claim 1,
wherein the variable-bandpass filter is configured as an analog filter, and
the method further comprising the steps of:
controlling said passband width of the analog filter by control of a time constant, and
switching of one of a number of filter stages and a selection from a group of filters with a plurality of passbands widths.

8. The filter control method for a wireless receiver according to claim 1,
wherein, during a preamble period of the input signal, the method comprises the steps of:
detecting the amplitude level of the input signal using said automatic gain control circuit,
determining a gain and a bandwidth, and
setting the gain of the programmable gain amplifier and the bandwidth of the variable-bandpass filter.

9. The filter control method for a wireless receiver according to claim 1, wherein the passband width is controlled about a predetermined center frequency.

10. A low-frequency signal processing circuit for a wireless receiver comprising:
a programmable gain amplifier;
a variable-bandpass filter; and
an automatic gain control circuit to control a gain for the programmable gain amplifier an optimum value,
wherein the automatic gain control circuit is provided with a function of controlling a passband width of the variable-bandpass filter based on a result obtained by detecting an amplitude level of an input signal received at an antenna.

11. The low-frequency signal processing circuit for a wireless receiver according to claim 10,
wherein the automatic gain control circuit compares an estimated value of an antenna reception level with a predetermined value that has been set in advance,
wherein, when said estimated value of the antenna reception level is larger than the predetermined value, a bandpass control signal to control the variable-bandpass filter is generated so that the passband width of the variable-bandpass filter is made narrower, and
wherein, when said estimated value of the antenna reception level is smaller than the predetermined value, a bandpass control signal to control the variable-bandpass filter is generated so that the passband width of the variable-bandpass filter is made broader.

12. The low-frequency signal processing circuit for a wireless receiver according to claim 10,
wherein the automatic gain control circuit includes a level detection unit to detect the amplitude level of the input signal, a gain setting unit to set an optimum gain value for the programmable gain amplifier based on a result detected by the level detection unit, an antenna reception level estimation unit, and a comparator,
wherein the antenna reception level estimation unit estimates an amplitude level of the input signal at an antenna terminal based on the amplitude level detected by the level detection unit and a gain value held by the gain setting unit, and
wherein the comparator compares the estimated amplitude level of the antenna reception level estimation unit with a predetermined value that has been set in advance,
wherein, when said estimated amplitude level of the antenna reception level estimation unit is larger than the predetermined value, a bandpass control signal is generated so that the passband width of the variable-bandpass filter is made narrower, and
wherein, when said estimated amplitude level of the antenna reception level estimation unit is smaller than the predetermined value, a bandpass control signal is generated so that the passband width of the variable-bandpass filter is made broader.

13. The low-frequency signal processing circuit for a wireless receiver according to claim 10, wherein the variable-bandpass filter is configured as a digital filter and is provided with a function of controlling the passband width of the digital filter by switching one of a tap coefficient and a number of tap stages.

14. The low-frequency signal processing circuit for a wireless receiver according to claim 10, wherein the variable-bandpass filter is configured as an analog filter, and the passband width of the analog filter is controlled by one of control of a time constant, switching of a number of filter stages, and a selection from a group of filters with a plurality of passbands.

15. The low-frequency signal processing circuit for a wireless receiver according to claim 10, wherein, during a preamble period of the input signal, the automatic gain control circuit detects the amplitude level of the input signal to determine a gain and a bandwidth, and sets the gain of the programmable gain amplifier and the bandwidth of the variable-bandpass digital filter.

16. The low-frequency signal processing circuit for a wireless receiver according to claim 10, wherein a predetermined value set in advance is a fixed gain that has been set in advance based on a sum of gains in previous stages of the automatic gain control circuit.

17. The low-frequency signal processing circuit for a wireless receiver according to claim 10, wherein the passband width is controlled about a predetermined center frequency.

18. An integrated circuit for a wireless receiver which comprises:
   a high-frequency signal processing unit; and
   a low-frequency signal processing unit, said low-frequency signal processing unit including:
   a programmable gain amplifier,
   a variable-bandpass filter, and
   an automatic gain control circuit to control a gain for the programmable gain amplifier to an optimum value,
   wherein the automatic gain control circuit is provided with a function of controlling a passband width of the variable-bandpass filter based on a result obtained by detecting an amplitude level of an input signal received at an antenna.

19. The integrated circuit for a wireless receiver according to claim 18,
   wherein the automatic gain control circuit compares an estimated value of an antenna reception level with a predetermined value that has been set in advance,
   wherein, when said estimated value of the antenna reception level is larger than the predetermined value, a bandpass control signal to control the variable-bandpass filter is generated so that the passband width of the variable-bandpass filter is made narrower, and
   wherein, when said estimated value of the antenna reception level is smaller than the predetermined value, a bandpass control signal to control the variable-bandpass filter is generated so that the passband width of the variable-bandpass filter is made broader.

20. The integrated circuit for a wireless receiver according to claim 18,
   wherein the automatic gain control circuit includes a level detection unit to detect the amplitude level of the input signal, a gain setting unit to set an optimum gain value of the programmable gain amplifier based on the amplitude level detected by the level detection unit, an antenna reception level estimation unit, and a comparator,
   wherein the antenna reception level estimation unit estimates an amplitude level of the input signal at an antenna terminal based on the amplitude level detected by the level detection unit and a gain value held by the gain setting unit,
   wherein the comparator compares the estimated amplitude level of the antenna reception level estimation unit with a predetermined value that has been set in advance,
   wherein, when said estimated amplitude level of the antenna reception level estimation unit is larger than the predetermined value, a bandpass control signal is generated so that the passband width of the variable-bandpass filter is made narrower, and
   wherein when said estimated amplitude level of the antenna reception level estimation unit is smaller than the predetermined value, a bandpass control signal is generated so that the passband width of the variable-bandpass filter is made broader.

21. The integrated circuit for a wireless receiver according to claim 18, wherein the variable-bandpass filter is configured as a digital filter and is provided with a function of controlling the passband width of the digital filter by switching one of a tap coefficient and a number of tap stages.

22. The integrated circuit for a wireless receiver according to claim 18, wherein the passband width is controlled about a predetermined center frequency.

\* \* \* \* \*